C. L. GOEHRING.
Thill-Coupling.
No. 222,819.  Patented Dec. 23, 1879.
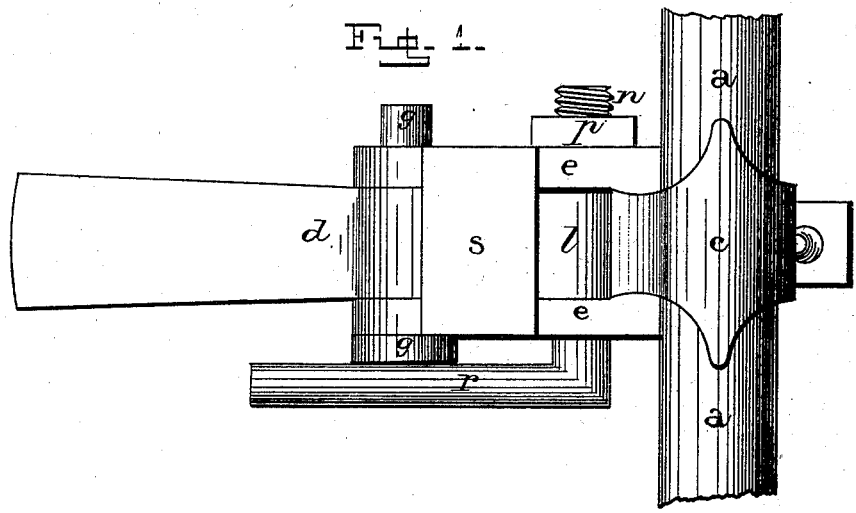
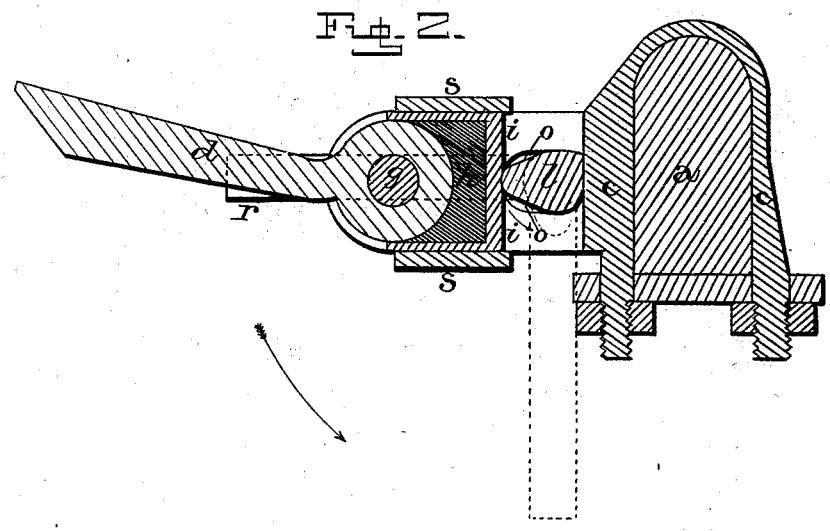
Witnesses:
J. W. Garner
Wm W. Mortimer
Inventor:
C. L. Goehring, M.D.
per
F. A. Lehmann, Atty.

UNITED STATES PATENT OFFICE.

CHARLES L. GOEHRING, OF ALLEGHENY, PENNSYLVANIA.

IMPROVEMENT IN THILL-COUPLINGS.

Specification forming part of Letters Patent No. 222,819, dated December 23, 1879; application filed November 17, 1879.

*To all whom it may concern:*

Be it known that I, CHARLES LEWIS GOEHRING, M. D., of Allegheny, in the county of Allegheny and State of Pensylvania, have invented certain new and useful Improvements in Thill-Couplings; and I do hereby declare the following to be a full, clear, and exact description of the invention, such as will enable others skilled in the art to which it pertains to make and use it, reference being had to the accompanying drawings, which form part of this specification.

My invention relates to an improvement in thill-couplings; and it consists in forcing the rubber or other material forward against the coupling-bolt by means of a cam, which cam has an operating-handle connected thereto, which not only serves to turn the cam, but as a guard to prevent the coupling-bolt from coming out, as will be more fully described hereinafter.

Figure 1 is a plan view of my invention. Fig. 2 is a vertical section of the same.

$a$ represents the axle; $c$, the clip, and $d$ the end of the thill that is to be coupled to the vehicle. The clip is made in a single piece with the box or shackle $e$, which has an eye made through its front end for the coupling-bolt $g$ to pass through it and the inner end of the thill. Moving back and forth in this shackle is the box $i$, in which is placed a block of rubber, $h$, or other elastic material, that is to be pushed against the inner end of the thill, so as to prevent it from rattling while the vehicle is in motion. In order to prevent the movement of the thill from wearing this rubber, a piece of sheet metal, leather, or other suitable material will be interposed between the two.

Through the inner end of the shackle, on each side, is made a hole, $o$, through which is passed the cam $l$, which is used to push the rubber forward against the end of the thill. These holes are made slightly longer than is necessary for the mere insertion of the cam or its screw end $n$, which receives the holding-nut $p$.

On the inner end of the cam is formed the operating-lever $r$, by means of which the cam is moved both for forcing the rubber forward and for turning the cam so that it will allow the rubber to be moved back out of the way. This lever or handle serves both to move the cam and as a guard, when the rubber is forced forward, to prevent the coupling-bolt from becoming displaced. When the rubber is not forced forward this handle hangs loosely downward; but when the coupling is locked the lever extends rigidly forward past the head of the bolt, so as to lock the bolt so securely in place that it cannot possibly become displaced while the coupling is locked.

The thicker end of the cam is made square, and the lower corner is slightly rounded off, so that when the cam is turned a certain distance by the lever the center is passed, and then the back pressure of the rubber causes the cam to snap into position.

When locked in position the square part of the cam abuts against the back end of the shackle, in which position the rubber holds the cam so securely that it can only be moved by force, and so will never be in danger of working loose. While the cam is being locked its two ends are being forced forward in their holes, and as soon as the cam snaps into place these ends move backward into the rear ends of their holes; and it is to allow this movement that the holes are made longer or larger than is simply needed to hold the two ends.

It is not absolutely necessary that a nut should be used on the outer end of this cam; but it is better that it should be used, so as to always keep the cam in place. The top and bottom pieces, $s$, of the shackle serve to keep the box $i$ in place and guide it in its movements back and forth, so that the action of the cam cannot displace it.

The special advantages of my coupling are, that every part can be made by dies; each part is cheap and simple, the locking is accomplished by a positive movement, and there are no parts that can work loose and get lost while the vehicle is in use.

Having thus described my invention, I claim—

1. In a thill-coupling, a cam to force the rubber against the end of the thill, the cam being provided with a handle, which serves both to move the cam and to lock the coupling-bolt in place, substantially as set forth.

2. The shackle $e$, having a hole, $o$, through each side, in combination with the cam $l$, made square upon the rear side, and having its lower corner rounded away, and provided with the handle $r$ for locking the bolt $g$ in place, the parts being so constructed that the rubber $h$ causes the cam to snap in position and holds it there, substantially as described.

In testimony that I claim the foregoing I have hereunto set my hand this 13th day of November, 1879.

C. L. GOEHRING, M. D.

Witnesses:
 F. A. LEHMANN,
 H. J. ENNIS.